United States Patent
Jahnke et al.

(10) Patent No.: US 8,445,147 B2
(45) Date of Patent: May 21, 2013

(54) FUEL HUMIDIFIER ASSEMBLY FOR USE IN HIGH TEMPERATURE FUEL CELL SYSTEMS

(75) Inventors: Fred C. Jahnke, Rye, NY (US); Joseph M. Daly, Bethel, CT (US); Matti A. Lilback, Cheshire, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1088 days.

(21) Appl. No.: 12/393,623

(22) Filed: Feb. 26, 2009

(65) Prior Publication Data

US 2010/0216039 A1    Aug. 26, 2010

(51) Int. Cl.
*H01M 8/06* (2006.01)
(52) U.S. Cl.
USPC ............ 429/413; 429/430; 429/442; 429/443
(58) Field of Classification Search
USPC .......................................... 429/413, 430, 442
See application file for complete search history.

(56) References Cited

U.S. PATENT DOCUMENTS

| | | | |
|---|---|---|---|
| 3,973,993 A * | 8/1976 | Bloomfield et al. ........... | 429/423 |
| 4,039,579 A | 8/1977 | Connor et al. | |
| 4,120,787 A * | 10/1978 | Yargeau ........................ | 210/664 |
| 4,539,267 A | 9/1985 | Sederquist | |
| 5,068,159 A | 11/1991 | Kinoshita | |
| 6,370,880 B1 | 4/2002 | Smith et al. | |
| 6,375,906 B1 * | 4/2002 | Edlund et al. ................. | 429/112 |
| 6,502,402 B1 | 1/2003 | Smith et al. | |
| 7,060,382 B2 | 6/2006 | Jahnke et al. | |
| 2007/0017207 A1 | 1/2007 | Smith et al. | |
| 2009/0110989 A1 | 4/2009 | Daly et al. | |

FOREIGN PATENT DOCUMENTS

| | | | |
|---|---|---|---|
| DE | 2621604 | * | 12/1977 |
| GB | 2457970 | * | 9/2009 |
| JP | 11-214022 A | | 6/1999 |
| JP | 2000-058092 A | | 2/2000 |
| JP | 2004-199981 A | | 7/2004 |

OTHER PUBLICATIONS

JP 2004-199981 translation.*
JP 11-214022 (translation).*
BE 854581 (Derwent abstract).*
Catalog of Shandong Taihe Water Treatment Co.,Ltd.*
Oct. 13, 2010 PCT Search Report and Written Opinion which issued in counterpart PCT application No. PCT/US2010/025430.
U.S. Department of Energy, Jan. 2006, Energy Efficiency and Renewable Energy, Energy Tips-Steam.

* cited by examiner

*Primary Examiner* — Patrick Ryan
*Assistant Examiner* — Alex Usyatinsky
(74) *Attorney, Agent, or Firm* — Cowan, Liebowitz & Latman, P.C.

(57) ABSTRACT

A humidifier assembly for humidifying fuel for use in a fuel cell system, comprising a water heater adapted to receive recycled water and to generate heated water using cathode exhaust, and a fuel saturator adapted to receive deaerated cleansed water, at least a portion of the deaerated cleansed water comprising the heated water, and fuel and to humidify the fuel with a first portion of the deaerated cleansed water, the fuel saturator tower outputting humidified fuel for use in the fuel cell system and a second portion of the deaerated cleansed water for use as recycled water in the water heater.

56 Claims, 3 Drawing Sheets

FUEL HUMIDIFIER ASSEMBLY FOR USE IN HIGH TEMPERATURE FUEL CELL SYSTEMS

BACKGROUND OF THE INVENTION

This invention relates to fuel humidification for use in high temperature fuel cell systems and which can also be used in conjunction with water recovery.

A fuel cell is a device which directly converts chemical energy stored in hydrocarbon fuel into electrical energy by means of an electrochemical reaction. Generally, a fuel cell comprises an anode electrode and a cathode electrode separated by an electrolyte, which serves to conduct electrically charged ions. High temperature fuel cells, such as molten carbonate fuel cells, operate by passing a reactant fuel gas through the anode, while oxidant gas containing carbon dioxide and oxygen is passed through the cathode.

Reactant gases supplied to the fuel cell, and in particular, the reactant fuel gas supplied to the anode, must be sufficiently humidified to maintain a desired carbon to steam ratio in the fuel for proper and efficient fuel cell operation, to provide sufficient ionic conductivity of the reactant gases and to prevent carbon deposition, or soot formation, in the fuel cell. The amount of water consumed by fuel cell system for humidifying reactant gases is usually significant and requires a continuous supply of water to the fuel cell system. Accordingly, water management in fuel cell systems is very important and has a significant impact on fuel cell performance and operating efficiencies.

Water for humidifying reactant gases may be supplied from an external water supply source or may be recycled from anode and/or cathode exhaust gases by separating water vapor produced by the electrochemical reaction in the fuel cell. Examples of water recycling from the anode exhaust gas are disclosed in U.S. Pat. Nos. 5,068,159 and 4,039,579, which teach using a cooler and condenser to separate water from the anode exhaust stream, and thereafter passing the separated water through a boiler and a heater and feeding the water to the inlet of the anode compartment.

Another U.S. Pat. No. 7,060,382, assigned to the same assignee herein, discloses a system in which a water transfer assembly in the form of a partial-pressure swing water transfer wheel is used to separate water vapor in anode exhaust as water to the fuel feed. This patent also discloses a system in which this transfer is carried out by using heat exchangers, where the anode exhaust is cooled by the oxidant supply gas, water recycle vaporization and/or a cooling water or an ambient-air cooled heat exchanger (air fan). After being cooled, the stream is fed to a scrubbing and blow-down assembly where electrolyte contaminated water is removed. The resultant stream is then further cooled in a heat exchanger using an air fan or cooling water and the stream is then fed to a condensing unit. In this unit, the water is removed and fed to the fuel feed, while the stream is further fed to a carbon dioxide transfer assembly.

Fresh water used for humidification of the reactant gases in a fuel cell system is usually in the form of steam and must be free of electrolyte and other volatile and non-volatile contaminants. Therefore, fresh water supplied to the fuel cell system usually has to be treated in a water treatment system before it is suitable for humidifying the reactant gases, and in particular, the fuel supplied to the fuel cell. Such water treatment systems require complex, expensive high-pressure drop water treatment equipment to remove contaminants from the feed water. Moreover, conventional humidification systems employ heat exchanger equipment which is expensive and/or has relatively low reliability.

It is therefore an object of the present invention to provide a fuel humidification assembly which has a simpler and more reliable design.

It is also an object of the present invention to provide a fuel humidification assembly which does not require the conventional water treatment and high pressure drop equipment.

It is a further object of the present invention to provide a fuel humidification assembly which results in greater manufacturing and operating efficiencies in the fuel cell system.

SUMMARY OF THE INVENTION

The above and other objectives are realized in a fuel humidification assembly for use in a fuel cell system comprising a water heater adapted to receive recycled water and to generate heated water using heat from cathode exhaust, and a fuel saturator column adapted to receive fuel and deaerated cleansed water, at least a portion of the deaerated cleansed water comprising the heated water, and to humidify the fuel with a first portion of the deaerated cleansed water, the fuel saturator column outputting humidified fuel for use in the fuel cell system and a second portion of the deaerated cleansed water for use as recycled water in the water heater. A portion of the heated water generated in the water heater comprises steam. The fuel humidification assembly also includes a deaerator column adapted to receive heated water from the water heater and supply water and to pass the steam portion of the heated water through the supply water so as to remove air and volatile contaminants from the supply water and to condense a portion of the steam into the supply water. The deaerator column outputs deaerated cleansed water to the fuel saturator column. In the deaerator column, the steam is passed through the supply water by bubbling through a packed column or a trayed column.

The fuel saturator column comprises a packed column or a trayed column which promotes mixing and contact between the fuel and the deaerated cleansed water. In certain embodiments, the fuel saturator is a counter-current flow packed column. In some embodiments, the fuel saturator column receives the deaerated cleansed water at a top portion of the fuel saturator column so that the deaerated cleansed water flows through the fuel saturator column in a downward direction and the fuel saturator receives the fuel at a bottom portion of the fuel saturator column so that the fuel flows through the fuel saturator column in an upward direction toward the top portion, and the humidified fuel is outputted from the top portion of the fuel saturator column, while the second portion of deaerated cleansed water is outputted from the bottom portion of the fuel saturator.

In some embodiments, the humidifier assembly also comprises a second heater for super-heating humidified fuel using heat from the cathode exhaust, wherein the cathode exhaust is first passed through the second heater and then through the water heater. The humidifier may also include a bypass line for bypassing a predetermined amount of humidified fuel around the second heater.

In certain embodiments, the humidifier assembly further comprises a circulation pump which recycles the second deaerated cleansed water portion from the fuel saturator column and a water blowdown assembly which receives the second deaerated cleansed water portion from the circulation pump and removes non-volatile contaminants and dissolved solids with a predetermined portion of the second deaerated cleansed water portion from the humidifier assembly using a water blowdown technique. The duration and frequency of the water blowdown technique is controlled by a controller based on a measured electric conductivity of the second deaerated cleansed water.

The humidifier assembly also includes a controller which controls the amount of the first water portion used to humidify the fuel. In particular, the controller controls the amount of the first water portion by controlling the flow rate of the deaerated cleansed water provided to the fuel saturator column from the deaerator column such that the fuel saturator column has a predetermined overhead temperature, e.g. 200° F. or greater. The flow rate of the deaerated cleansed water is controlled by controlling the flow rate of the second deaerated cleansed water portion from the fuel saturator column to the water heater. In addition, the controller controls the temperature of the deaerated cleansed water by controlling pressure within the deaerator column, which in turn is controlled by controlling a flow of uncondensed steam portion outputted from the deaerator column.

A fuel cell system including at least one fuel cell with an anode and a cathode and employing the humidifier assembly for humidifying fuel supplied to the anode is also described.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
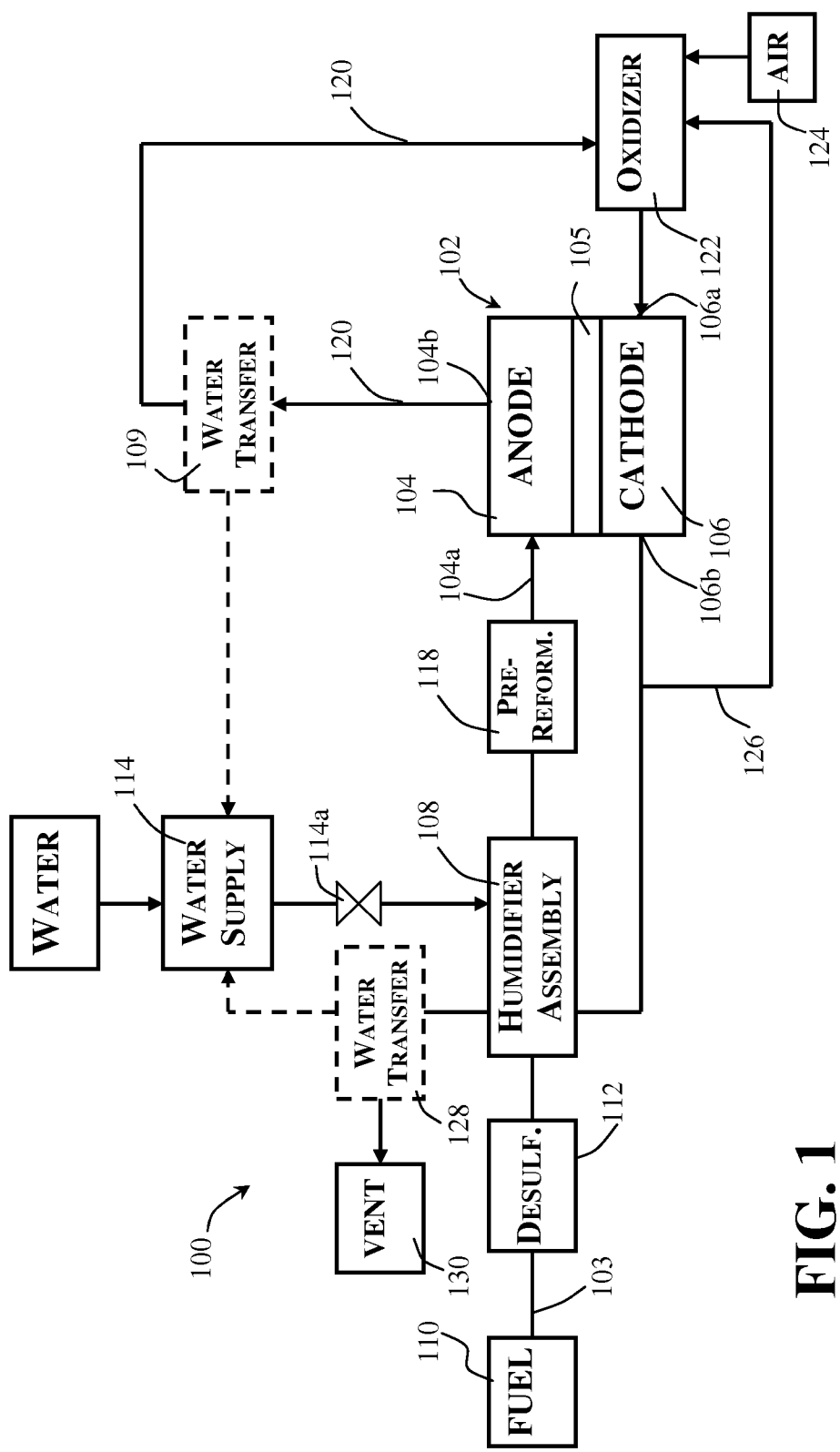
FIG. 1 shows a block diagram of a fuel cell system using a humidification assembly for treating water supplied to the system and humidifying fuel supplied to the fuel cell.

FIG. 1 shows a fuel cell system 100 comprising a fuel cell stack 102 including an anode side 104, adapted to receive fuel from a fuel supply path 103 and to output anode exhaust, and a cathode side 106 adapted to receive oxidant gas and to output cathode exhaust, and a humidifier assembly 108 for heating and humidifying the fuel in the fuel supply path 103 with water from a water supply 114.

More particularly, the fuel cell stack 102 of the system 100 comprises at least one fuel cell having the anode side or compartment 104 and the cathode side or compartment 106, separated by an electrolyte matrix 105. A hydrocarbon containing fuel, such as natural gas or propane, is supplied from a fuel supply 110 to a fuel supply path 103 which carries the fuel through a desulfurizer 112 for removal of sulfur-containing compounds present in the fuel. The desulfurizer 112 comprises one or more sulfur-adsorbent or sulfur-absorbent beds through which the fuel flows and which adsorb or absorb any sulfur-containing compounds in the fuel.

After being passed through the desulfurizer 112, the fuel in the supply line 103 is conveyed to the humidifier assembly 108 which is also adapted to receive water from the water supply 114. The water supply 114 is provided with water from an external source and/or water recycled from anode and/or cathode exhaust. In the humidifier assembly 108, water from the water supply 114 is deaerated, cleansed from non-volatile contaminants and converted into vapor to humidify the fuel, and the humidified fuel is then heated to a predetermined temperature using hot cathode exhaust. The humidifier assembly 108 is shown in more detail in FIG. 2 and will be discussed in detail herein below.

The super-heated humidified fuel is then passed from the humidifier assembly 108 to a deoxidizer/preconverter or prereformer unit 118, which removes any trace oxygen and heavy hydrocarbon contaminants from the fuel. Although not shown in FIG. 1, after passing through the deoxidizer/preconverter or prereformer unit 118, the fuel may be further heated by cathode exhaust. The pre-heated deoxidized humidified fuel is then supplied to the anode side 104 of the fuel cell 102 through an inlet 104a.

Fuel entering the anode side 104 is reformed therein to produce hydrogen and carbon monoxide and undergoes an electrochemical reaction with oxidant gas passing through the cathode side 106 to form water and carbon dioxide as the fuel cell produces electrical power. Anode exhaust gas produced in the anode 104 leaves the fuel cell 102 through an anode outlet 104b into an anode exhaust path 120. The anode exhaust gas in the exhaust path 120 comprises unreacted fuel, including hydrogen and carbon monoxide, reaction products, including water vapor and carbon dioxide, and other trace compounds, such as electrolyte vapor and trace amounts of other gases.

As shown in FIG. 1, in certain embodiments, the anode exhaust in the exhaust path 120 is conveyed to a water transfer assembly 109 in which the anode exhaust gas is cooled and water is separated from the other components of the anode exhaust. An example of a water transfer assembly suitable for separating water from the other components of the anode exhaust is described in a co-pending application Ser. No. 11/931,746, assigned to the same assignee herein, the entire disclosure of which is incorporated herein by reference. Other water transfer assemblies may also be suitable for use in the fuel cell system 100 of FIG. 1.

Water separated from the anode exhaust in the water transfer assembly is passed to the water supply 114, which then supplies the water to the humidifier assembly 108 for humidifying the fuel. Separated anode exhaust outputted by the water transfer assembly comprises primarily hydrogen, CO and $CO_2$ with trace amounts of water and unconverted hydrocarbons, such as methane. In the illustrative embodiment shown in FIG. 1, the separated anode exhaust is carried from the water transfer assembly 109 by the anode exhaust path 120 to an oxidizer 122, which also receives oxidant gas in the form of air from an air supply 124.

It is understood that the water transfer assembly 109 shown in FIG. 1 for transferring water from anode exhaust gas is optional. In certain embodiments, which do not employ the water transfer assembly 109, the anode exhaust is passed directly from the anode to the oxidizer 122 through the anode exhaust path. Moreover, in some embodiments, the anode exhaust may be passed through a heat exchanger (not shown for purposes of clarity and simplicity) to transfer heat from the anode exhaust before passing the anode exhaust to the oxidizer. The heat transferred from the anode exhaust may be used, for example, for pre-heating the fuel in the fuel supply path 103, for pre-heating humidified fuel in the humidifier assembly 108, or for pre-heating oxidant gas from the air supply 124.

In the oxidizer 122, oxidant gas is mixed with the separated anode exhaust, or with anode exhaust, and combusted to produce heated oxidant gas including primarily nitrogen, oxygen, carbon dioxide and water vapor. Heated oxidant gas leaving the oxidizer 122 is thereafter conveyed to the cathode side 106 through a cathode inlet 106a. Depleted oxidant gas exits the cathode 106 through a cathode outlet 106b and is then used for pre-heating water and fuel in the humidifier assembly 108. As shown in FIG. 1, a portion of the depleted oxidant gas may be recycled to the oxidizer 122 through a cathode recycle path 126 for mixing with the oxidant gas from the air supply 124.

Moreover, in certain embodiments, after passing through the humidifier assembly and pre-heating the water and fuel in the humidifier assembly, depleted cathode exhaust may be passed to a cathode water transfer assembly 128 for separating water in the cathode exhaust. In the cathode water transfer assembly 128, the cathode exhaust is further cooled so as to condense the water from the cathode exhaust. An example of such water transfer assembly suitable for separating water from the cathode exhaust is described in a co-pending application Ser. No. 12/042,231, assigned to the same assignee herein, the entire disclosure of which is incorporated herein by reference. Other water separating assemblies may also be suitable for use as the water transfer assembly 128 in the fuel cell system 100 of FIG. 1. Water separated from the cathode exhaust in the water transfer assembly 128 is passed to the water supply 114, which then supplies the water to the humidifier assembly 108 for humidifying the fuel. Separated cathode exhaust is outputted from the system 100 through a vent 130.

Figure 2:
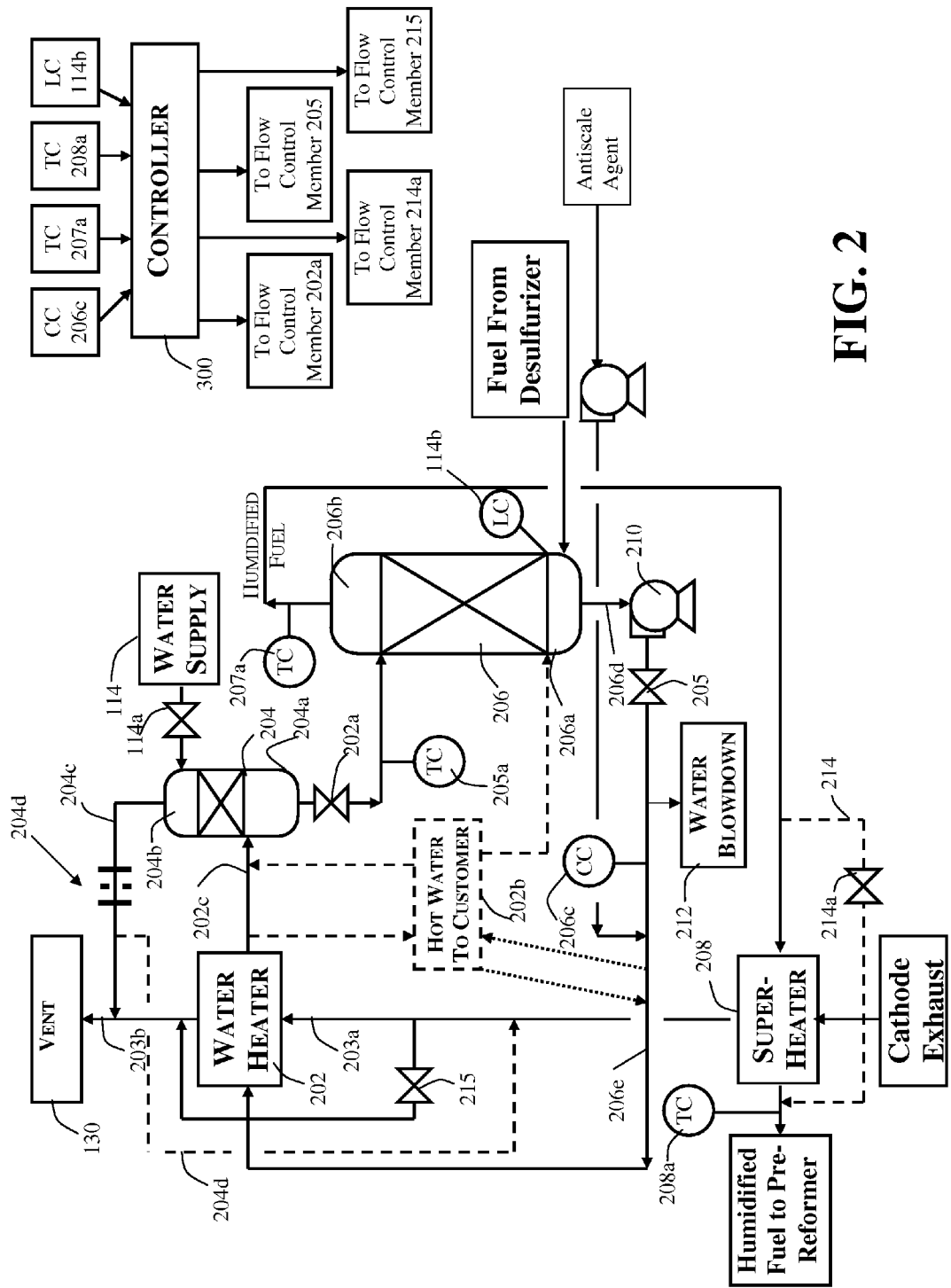
FIG. 2 shows a detailed view of the humidification assembly of FIG. 1.

FIG. 2 shows a more detailed schematic view of the humidifier assembly 108 of FIG. 1. As shown in FIGS. 1 and 2, the humidifier assembly 108 receives supply water from the water supply 114, which, as mentioned herein above, receives water from an external source and/or recycled water separated from anode and/or cathode exhaust gases. The humidifier assembly 108 also receives fuel from the desulfurizer, and humidifies and super-heats the fuel to produce super-heated humidified fuel suitable for use in the fuel cell. The operation of the humidifier assembly 108 is controlled by a controller 300 which controls the extent of humidification of the fuel as described in more detail herein below.

As shown in FIG. 2, the humidifier assembly 108 includes a water heater 202 which receives water and generates hot (heated) water, that may include a small portion of steam, by using heat from the cathode exhaust, a deaerator/thermal control column 204 for stripping air and other dissolved gases from the supply water, a fuel saturator 206 for saturating fuel with water and outputting hot (heated) humidified fuel, and a super-heater 208 for super-heating humidified fuel using heat from the cathode exhaust. As shown, supply water from the water supply 114 is conveyed through a supply water flow control member 114a to the deaerator/thermal control column 204, which also receives hot water from the water heater 202 via a flow control member 202a. In a typical example of the humidifier assembly 108 sized for a 250 kW fuel cell system, the supply water is supplied to the deaerator/thermal control column 204 from the water supply at a flow rate of about 1 gallon per minute. However, the flow rate of the supply water may be varied depending on the configuration, size and requirements of the fuel cell system.

The deaerator/thermal control column 204 in this illustrative embodiment comprises a liquid distributor that evenly distributes incoming fresh water from the water supply 114 over an entire area of the column, and a packed or tray section for promoting countercurrent contact of downflowing fresh supply water with an upflowing steam portion of the hot water received from the water heater 202. A commercially available v-notch weir liquid distributor is suitable for evenly distributing the incoming supply water over the entire column area. Also, commercially available random packing may be used to form the packed section of the deaerator/thermal control column 204. When the hot water is conveyed to the deaerator/thermal control column, a portion of the hot water may be flash converted into steam as the hot water enters the column 204 due to the pressure drop from the piping, or the connecting line 202c, to the deaerator/thermal control column. In the deaerator/thermal control column, the steam portion of the hot water from the water heater 202 is passed through the supply water from the water supply, such as by bubbling the steam through the supply water by means of the packed section or a plurality of trays. In this way, air and volatile contaminants are steam stripped from the supply water, thus deaerating and cleansing the supply water. In addition, the supply water in the deaerator/thermal control column 204 is mixed with, and heated by, the hot water from the water heater by condensing a part of the steam portion flowing through the column 204. The deaerated cleansed water produced in the deaerator/thermal control column 204, which includes cleansed and deaerated supply water and the remaining hot water that has not been vaporized in the deaerator/thermal control column, drains to a liquid reservoir in a bottom portion of the deaerator/thermal control column 204. In certain embodiments, the deaerator/thermal control column 204 includes a mechanical float valve or a deaerator level control member which ensures that a liquid level or water seal is maintained in the column 204 as the steam-stripped water flows from the deaerator/thermal control column to the fuel saturator 206. The mechanical float valve or deaerator level control member is controlled by the controller so as to maintain the desired liquid level in the column 204 and to provide a steady and continuous flow of deaerated cleansed water from the deaerator/thermal control column 204 to the fuel saturator 206. In this way, unwanted fluctuations in the fuel saturator overhead temperature and in steam to fuel ratio are prevented, and the operation of the fuel cell system is improved.

As shown in FIG. 2, the uncondensed portion of the hot water steam portion mixed with air and volatile contaminants stripped from the supply water are outputted from the deaerator/thermal control column 204 to a connecting line 204c, passed through a restriction orifice 204d in the connecting line 204c, and thereafter combined with the cathode exhaust leaving the water heater 202 via a connecting line 203b. The cathode exhaust heats and dilutes the outputted uncondensed steam portion to avoid a steam plume from the system and the mixture of the cathode exhaust and the steam is thereafter outputted from the system 100 using the vent 130.

The temperature in the deaerator/thermal control column 204 and the temperature to which the supply water is heated, i.e. the temperature of deaerated cleansed water, are controlled by modulating a flow control meter 215 so as to control the amount of heat provided by the cathode exhaust to the water heater 202 to heat the water therein. In particular, the flow control meter 215 controls the amount of cathode exhaust in a cathode exhaust flow path 203a that is bypassed around the water heater 202, thereby controlling the amount of heat provided from the cathode exhaust to the water heater. In an open system, the addition of more heat to boiling water would only result in greater vaporization, but not in a water temperature increase. However, in the present embodiment of the invention, the temperature of the water is caused to increase as more heat is added to the water in the water heater 202 by employing a flow restriction orifice 204d through which all excess vapor exits the system. When a greater amount of water vapor is produced in the water heater, excess vapor exits through the flow restriction orifice 204d, causing the pressure drop across the flow restriction orifice 204d to increase. The increase in the pressure drop across the flow restriction orifice 204d causes the pressure in the deaerator/thermal control column 204 and the temperature of the water at vapor-liquid equilibrium to increase. Controlling the amount of heat provided to the water in the water heater 202 and thus, the temperature in the deaerator/thermal control column 204, also controls the amount of fuel humidification, or fuel saturation, performed in the fuel saturator 206. In addition, controlling the amount of heat provided to the water in the water heater 202 by controlling the flow control meter 215 also indirectly controls the pressure in the deaerator/thermal control column 204 such that the pressure in the deaerator/thermal control column 204 is increased by increasing the amount of heat provided to the water in the water heater.

An alternate or secondary method to control the pressure in the deaerator/thermal control column 204 may be employed by using a control valve instead of the restriction orifice 204d. In this embodiment, any excess heat transferred to the water in the water heater 202 would be removed in the form of steam vented through the connecting line 204c. However, this configuration may require an additional supply of water to compensate for the additional steam vented out of the system and may also reduce the potential amount of waste heat that can be recovered.

As discussed above, in the embodiment shown in FIG. 2, the uncondensed steam portion outputted from the deaerator/thermal control column 204 is combined with the cathode exhaust after the cathode exhaust passes through the water heater 202. However, in certain other illustrative embodiments, the uncondensed steam portion may be combined with the cathode exhaust upstream from the water heater 202 via a connecting line 204d so as to reduce the amount of heat transferred from the cathode exhaust to the water in the water heater 202. In this way, generation of excess heat in the water heater 202 may be avoided or reduced, and the amount of supply water required may also be reduced when the heat transferred is not controlled by the flow control member 215.

As shown in FIG. 2, the deaerator/thermal control column 204 also outputs deaerated cleansed water, which includes the deaerated and cleansed supply water and the unvaporized portion of the hot water. In the illustrative embodiment of FIG. 2, the deaerated cleansed water is outputted as a bottom water stream from a bottom portion 204a of the deaerator/thermal control column 204, while the uncondensed steam portion is outputted from a top portion 204b of the deaerator/thermal control column 204.

In certain embodiments, recycled water separated from anode exhaust may be used instead of the fresh water from the water supply 114 or the fresh water from the water supply 114 may be already deaerated and cleansed. In such embodiments, the recycled water or the deaerated and cleansed water is already deaerated and cleansed of all volatile contaminants. In particular, the recycled water separated from the anode exhaust as disclosed in application Ser. No. 11/931,746, assigned to the same assignee herein, is deaerated and only includes a small amount of dissolved carbon dioxide, which is not harmful to the saturator or the humidification system. Accordingly, in such embodiments, the deaerator/thermal control column 204, the vent lines 204c and 204d, and the flow control valve 202a may be omitted.

Figure 3:
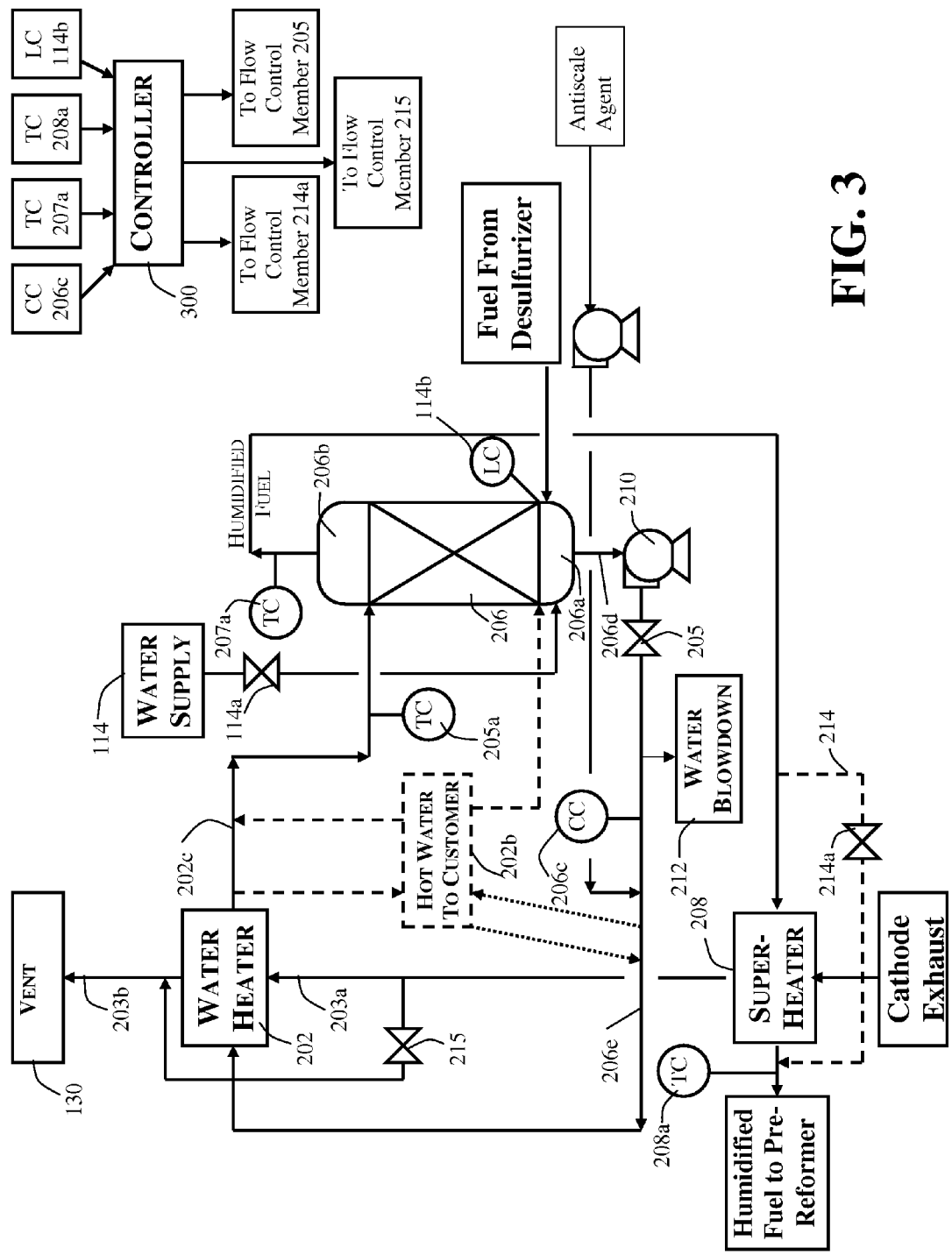
FIG. 3 shows a detailed view of another embodiment of the humidification assembly of FIG. 1.

FIG. 3 shows such an embodiment in which the deaerator/thermal control column, the vent line and the flow control valve are omitted. As shown in FIG. 3, hot water from the water heater 202 and the recycled and/or deaerated/cleansed water are supplied directly to the fuel saturator 206 without being first cleansed and deaerated in the deaerator/thermal control column 204. In the embodiment shown in FIG. 3, the hot water from the water heater is supplied to a top portion 206b of the saturator 206 and is used for humidifying fuel supplied to the saturator at or near a bottom portion 206a of the saturator 206. In particular, the hot water flows downward in the saturator 206 while the fuel flows upward in the saturator 206 and the fuel is humidified by coming into direct contact with the hot water. The construction of the saturator and the humidification process of FIG. 3 are the same as in FIG. 2 and are described in more detail herein below with respect to FIG. 2.

After passing through the fuel and humidifying the fuel, the remaining hot water is collected at the bottom portion 206a of the saturator 206 in a holding tank disposed in the bottom portion 206a of the saturator. As shown in FIG. 3, the recycled and/or deaerated/cleansed water is supplied to the bottom portion 206a of the saturator, and in particular, to the holding tank of the saturator, where it is mixed with the remaining hot water. As shown in FIG. 3, the water collected in the holding tank, which includes the remaining hot water after humidification of the fuel and the recycled and/or deaerated/cleansed water, is outputted from the saturator 206 and recycled to the water heater 202 via recycle line 206e. As shown, the recycled water conveyed from the saturator to the water heater may be cleansed using a water blowdown technique, described in more detail herein below, and/or an antiscale agent may be added to the recycled water, as also described in more detail below.

Referring now back to the embodiment shown in FIG. 2, the deaerated cleansed water outputted from the deaerator/thermal control column 204 is conveyed to the fuel saturator 206 through the flow control member 202a. As shown in FIG. 2, the fuel saturator 206 also receives fuel, such as natural gas, propane, or anaerobic digester gas (typically a byproduct from wastewater treatment plants containing about 60% methane and 40% carbon dioxide) from the desulfurizer. In a typical situation, the fuel is supplied at a temperature of about 75° F. at a pressure of about 6 psig. It is understood that in certain embodiments, the desulfurizer is not required, and that in such embodiments, the fuel is provided to the fuel saturator 206 directly from the fuel supply. The fuel saturator 206 in the present illustrative embodiment includes a packed or a trayed column that promotes mixing and contact between the fuel and the deaerated cleansed water, and saturates the fuel with the deaerated cleansed water. A counter-current packed column is suitable for use as the fuel saturator 206 in the humidifier assembly of FIG. 2.

In the embodiment shown in FIG. 2, the deaerated cleansed water is provided to the fuel saturator 206 near a top portion 206b of the fuel saturator and flows in a downward direction through the saturator 206, while the fuel is provided near a bottom portion 206a of the fuel saturator and flows in an upward direction through the saturator 206. In the fuel saturator 206, the fuel comes in direct contact with the deaerated cleansed water, and as a result, a first portion of the deaerated cleansed water is evaporated into the fuel, saturating the fuel with water vapor and producing humidified fuel. As described in more detail below, the remaining portion, or a second portion, of the deaerated cleansed water which has not evaporated into the fuel, is outputted from the fuel saturator 206 to a recycle line 206d for recycling to the water heater 202. The amount of the first portion of cleansed water evaporated into the fuel in the saturator 206 is directly related to the fuel saturator overhead temperature, which, in turn, is dependent on the flow rate and temperature of the deaerated cleansed water added to the saturator 206. In a typical situation, a saturator overhead temperature of 200° F. or greater, and typically an overhead temperature of about 205° F., is desired for sufficient saturation of the fuel with the water, such that the steam to carbon ratio of the humidified fuel is about 1.8.

As mentioned herein above, the operation of the humidifier assembly 108, and particularly, the amount of humidification of the fuel by the humidifier assembly, is controlled by the controller 300. In particular, the controller 300 directly controls the amount of humidification of the fuel, i.e. the amount of the first deaerated cleansed water portion that is used to humidify the fuel, by controlling the flow rate of the deaerated cleansed water provided to the fuel saturator. The controller 300 also controls indirectly the amount of humidification of the fuel, as discussed herein above, by controlling the temperature of the deaerated cleansed water as a result of controlling the pressure and temperature in the deaerator/thermal control column 204 by modulating the flow control member 215.

As shown in FIG. 2, the controller 300 controls the flow rate of the deaerated cleansed water to the fuel saturator column 206 so that the saturator overhead temperature 207a is at a desired temperature, e.g. 200° F. or greater and typically around 205° F., and to achieve a desired amount of fuel humidification, by controlling the flow control member 205. In particular, the controller 300 controls the flow control member 205 based on measured overhead temperature of the fuel saturator column, so as to adjust the flow rate of the second portion of the deaerated cleansed water recycled from the fuel saturator 206 to the water heater 202 via the recycle line 206d. The recycled second portion of the deaerated cleansed water is heated in the water heater 202, supplied to the deaerator/thermal control column 204 and thereafter to the fuel saturator 206. The overhead temperature of the fuel saturator 206 is measured using a temperature sensing member 207a, and then provided to the controller 300, which uses the measured temperature to control the flow control member 205. In certain embodiments, a pump 210, such as a centrifugal or a positive displacement pump, is provided in the recycle path 206d, and the flow of recycled deaerated cleansed water from the fuel saturator 206 to the water heater 202 is controlled by varying the speed of the pump 210 using a Variable Speed Drive.

Although not shown in FIG. 2, in some embodiments, the controller 300 also controls the flow rate of the supply water from the water supply 114 by controlling the supply water control member 114a so as to control a liquid level in the bottom portion 206a of the fuel saturator column 206. In particular, a level controller 114b is provided in the fuel saturator 206 to measure the liquid level in the fuel saturator column 206 and provide the measured liquid level to the controller 300. Based on the measured liquid level from the level controller 114b, the controller 300 controls the flow control member 114a so as to adjust the flow rate of supply water from the water supply 114 to the deaerator/thermal control column 204.

As shown in FIG. 2, the second portion of the deaerated cleansed water which has not evaporated into the fuel in the saturator column 206 is cooled as it flows through the fuel saturator column 206. In the embodiment shown in FIG. 2, the second portion of the water is outputted from the bottom portion 206a of the saturator column 206 as a bottom stream, while the humidified fuel comprising the mixture of fuel and the first portion of the water is outputted at the top portion 206b of the saturator column 206.

The humidified fuel is passed from the fuel saturator column 206 to the superheater 208 in which the humidified fuel is super-heated by the cathode exhaust. In a typical situation, the cathode exhaust passed through the superheater 208 has a temperature of about 1000° F. and the humidified fuel is super-heated to about 750° F. in the superheater 208. As shown, a portion of the humidified fuel may bypass the superheater via a bypass line 214 and then re-combined with the heated fuel portion outputted by the superheater 208. The bypassing of a portion of the humidified fuel allows for controlling of the temperature of the humidified fuel outputted from the humidifier assembly. The amount of humidified fuel bypassing the superheater 208 via the bypass line 214 is controlled by a flow control member 214a, such as a valve, which is controlled by the controller 300 based on the temperature of the humidified fuel portion outputted by the superheater 208. Temperature sensor 208a, such as a thermocouple, may be used to determine the temperature of the humidified fuel portion outputted by the superheater 208.

As shown in FIG. 2 and as mentioned above, the humidified fuel including super-heated humidified fuel outputted by the superheater 208 and the portion of the humidified fuel from the bypass line 214 is then outputted from the humidifier assembly 108 and is suitable for use in the fuel cell anode. In the embodiments shown in FIGS. 1 and 2, the humidified fuel from the humidifier assembly is passed to a deoxidizer/pre-converter or a pre-reformer unit 118 for further processing before being supplied to the fuel cell anode. However, in other embodiments, the humidified fuel may be passed directly from the humidifier assembly to the anode of the fuel cell.

In a system employing a 250 kW fuel cell, the second portion of the water, which is not evaporated into the fuel, is outputted from the fuel saturator 206 in a typical situation at a flow rate of about 5-20 gallons per minute and a temperature of about 160° F. The second water portion is passed from the saturator 206 to a circulation pump 210 which recycles the water to the water heater 202. As shown, before being passed to the water heater 202, the second portion of water may be treated using a water blowdown technique 212 to prevent accumulation of any non-volatile contaminants or dissolved solids dissolved in the water. The amount of water removed with the water blowdown stream will usually be relatively small as compared to the amount of water used up during water blowdown in conventional systems. In particular, in a typical situation, about 1-25%, and typically about 15-25%, of water is removed by the water blowdown technique, whereas in conventional systems, about 50% of the water is removed with the water blowdown stream. As can be appreciated, the amount of water removed by the water blowdown technique is smaller when the amount or concentration of dissolved solids in the second deaerated water portion is smaller.

The amount of water blowdown can also be minimized by using an antiscale agent which prevents precipitation of dissolved solids and thus, plugging or clogging of equipment caused by the dissolved solids, or by using clean water recovered and recycled from the fuel cell anode exhaust or cathode exhaust. The addition of the antiscale agent to the recycled second portion of the deaerated water is shown in FIG. 2. The antiscale agent suitable for use in the recycled second portion of the deaerated water is an antiscale agent from an organophospine or another chemical family.

In certain illustrative embodiments, the water blowdown operation and addition of the antiscale agent are controlled based on conductivity of the second deaerated water portion, wherein an increase in conductivity indicates a higher level or concentration of dissolved solids in the second deaerated water portion. In particular, conductivity of the second deaerated water portion is measured using a conductivity measuring unit 206c, and based on the measured conductivity, the controller adjusts the frequency and duration of the water blowdown operation so as to achieve a desired conductivity level and to prevent fouling. The controller also adjusts the rate of addition of the antiscale agent based on the measured conductivity so as to maintain a predetermined concentration of the anti-scale agent in the second deaerated water portion.

As mentioned herein above, the water heater 202 receives the water, comprising the second portion of the water from the fuel saturator 206 after the water blowdown operation, and generates the hot water which may contain a small portion of steam. In particular, the hot water is generated by the water heater 202 using heat from the cathode exhaust, which in a typical situation is heated to a temperature of about 240° F. and provides about 2% steam vapor by weight. The amount of steam vapor, however, may vary from about 0 to 5% depending on the system pressure and water flow rate. The hot water generated by the water heater 202 is then supplied via a hot water supply line 202c to the deaerator/thermal control column 204 for cleansing and deaerating the water from the water supply.

In some illustrative embodiments, a portion of the hot water generated in the water heater 202 is supplied from the hot water supply line 202c to a customer 202b which consumes the heat, or a portion of the heat, in the hot water and returns cooled water to the hot water supply line 202c or to the bottom portion 206a of the fuel saturator column 206 to be recycled via the recycle line 206d and pumped using the pump 210. In some embodiments, water from the customer 202b, or a portion thereof, is supplied to a pumped recycle line 206e for mixing with the recycled second portion of the deaerated water downstream from the flow control member 205 and the pump 210. The cooled water, or a portion thereof, from the customer 202b, which is returned to the hot water supply line 202c, is mixed with the hot water in the hot water supply line 202c before being passed to the deaerator/thermal control column 204. The export of heat to the customer is particularly useful when excess heat is produced in the water heater 202 for controlling the temperature of the hot water supplied to the deaerator/thermal control column 204. In addition, manufacturing and operating costs of the humidifier unit are reduced by eliminating a heat recovery unit, which would otherwise be required to recover the excess heat from the hot water generated in the water heater 202.

The humidifier assembly of FIG. 2 greatly reduces operating and manufacturing costs of the fuel cell system by eliminating a complex water treatment system and simplifying the heat exchanger design, also increasing the reliability of the humidifier assembly. In addition, the reduction of the amount of water consumed in the water blowdown in the present humidifier assembly as compared to the conventional systems results in a reduction of water supply requirements and in water disposal costs. Moreover, the humidifier assembly of FIG. 2 simplifies heat recovery in the humidifier assembly and the fuel cell system, thus resulting in additional operational cost efficiencies.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A humidifier assembly for humidifying fuel for use in a fuel cell system, comprising:
    a water heater adapted to receive recycled water and to generate heated water using heat from cathode exhaust, wherein a portion of said heated water comprises steam;
    a deaerator column receiving said heated water from said water heater and supply water and passing said steam from said heated water through said supply water so as to remove air and volatile contaminants from said supply water and to condense a portion of said steam into said supply water, and
    a fuel saturator column adapted to receive fuel and deaerated cleansed water from said deaerator column, at least a portion of said deaerated cleansed water comprising said heated water, and to humidify said fuel with a first portion of said deaerated cleansed water, said fuel saturator column outputting humidified fuel for use in said fuel cell system and a second portion of said deaerated cleansed water for use as recycled water in said water heater.

2. The humidifier assembly for use in a fuel cell system in accordance with claim 1, wherein said deaerated cleansed water further comprises water recovered from anode exhaust outputted from said fuel cell system.

3. The humidified assembly for use in a fuel cell system in accordance with claim 1, wherein said supply water provided to said deaerator column comprises water recovered from cathode exhaust outputted from said fuel cell system.

4. The humidifier assembly for use in a fuel cell system in accordance with claim 1, wherein said steam is passed through said supply water in said deaerator column by bubbling said steam through said supply water.

5. The humidifier assembly for use in a fuel cell system in accordance with claim 1, wherein said fuel saturator column comprises one of a packed column and a trayed column, said fuel saturator column promoting mixing and contact between said fuel and said deaerated cleansed water.

6. The humidifier assembly for use in a fuel cell system in accordance with claim 5, wherein said fuel saturator column is a counter-current flow packed column.

7. The humidifier assembly for use in a fuel cell system in accordance with claim 5, wherein said fuel saturator column receives said deaerated cleansed water at a top portion of said fuel saturator column so that said deaerated cleansed water flows through said fuel saturator column in a downward direction and said fuel saturator column receives said fuel at a bottom portion of said fuel saturator column so that said fuel flows through said fuel saturator column in an upward direction toward said top portion, and wherein said humidified fuel is outputted from said top portion of said fuel saturator column and said second portion of deaerated cleansed water is outputted from said bottom portion of said fuel saturator column.

8. The humidifier assembly for use in a fuel cell system in accordance with claim 1, further comprising a second heater for super-heating said humidified fuel using heat from cathode exhaust, wherein said cathode exhaust is first passed through said second heater and thereafter through said water heater.

9. The humidifier assembly for use in a fuel cell system in accordance with claim 8, further comprising a bypass line for bypassing a predetermined amount of said humidified fuel around said second heater, wherein said predetermined amount is determined based on a temperature of said super-heated humidified fuel outputted by said second heater and mixed with fuel bypassed by said bypass line.

10. The humidifier assembly in accordance with claim 1, further comprising a circulation pump for recycling said second deaerated cleansed water portion from said fuel saturator column and a water blowdown assembly adapted to receive said second deaerated cleansed water portion from said circulation pump and to remove non-volatile contaminants and dissolved solids with a predetermined portion of said second deaerated cleansed water portion from said humidifier assembly using a water blowdown technique.

11. The humidifier assembly in accordance with claim 10, further comprising:
a conductivity measuring unit for measuring electric conductivity of said second deaerated cleansed water; and
a controller adapted to receive said electric conductivity measurement from said conductivity measuring unit and control duration and frequency of said water blowdown technique based on said electric conductivity measurement so as to maintain a predetermined electric conductivity of said second deaerated cleansed water portion.

12. The humidifier assembly in accordance with claim 10, further comprising an antiscale agent, wherein said antiscale agent is added to said second deaerated cleansed water portion for preventing precipitation of dissolved solids in said second deaerated cleansed water portion.

13. The humidifier assembly in accordance with claim 12, wherein said antiscale agent comprises an organophospine antiscale agent and said antiscale agent is added to said second deaerated cleansed water portion at a predetermined rate so as to maintain a predetermined concentration of said antiscale agent in said second deaerated cleansed water portion.

14. The humidifier assembly in accordance with claim 1, further comprising a controller for controlling the amount of said first deaerated cleansed water portion used to humidify said fuel.

15. The humidifier assembly in accordance with claim 14, wherein said controller controls the flow rate of said deaerated cleansed water provided to said fuel saturator column by controlling the flow rate of said second deaerated cleansed water portion from said fuel saturator column to said water heater.

16. The humidifier assembly in accordance with claim 1, further comprising a deaerator level control member for controlling a liquid level in said deaerator column, and a controller for controlling said flow rate of said deaerated cleansed water from said deaerator column to said fuel saturator column by controlling said deaerator level control member.

17. The humidifier assembly in accordance with claim 1, wherein said deaerator column outputs an uncondensed portion of said steam, said humidifier assembly further comprising one of a control valve member and a restriction orifice for controlling the flow of said uncondensed steam, and said humidifier assembly further comprising a controller for controlling the temperature of said deaerated cleansed water by controlling pressure within said deaerator column, wherein said controller controls the pressure within said deaerator column by controlling said one of said control valve member and said restriction orifice.

18. The humidifier assembly in accordance with claim 1, wherein said deaerator column further outputs an uncondensed portion of said steam and wherein said uncondensed steam portion is mixed with said cathode exhaust upstream or downstream of said water heater.

19. The humidifier assembly in accordance with claim 1, wherein a part of said heated water generated by said water heater is exported to a customer for heat recovery from said heated water before passing said heated water to one of said deaerator column and said water heater.

20. A fuel cell system comprising:
at least one fuel cell including an anode for receiving fuel and outputting anode exhaust and a cathode for receiving oxidant gas and outputting cathode exhaust;
a humidifier assembly for humidifying said fuel supplied to said anode comprising a water heater adapted to receive recycled water and to generate heated water using heat from cathode exhaust, wherein a portion of said heated water comprises steam, a deaerator column receiving said heated water from said water heater and supply water and passing said steam from said heated water through said supply water so as to remove air and volatile contaminants from said supply water and to condense a portion of said steam into said supply water, and a fuel saturator column adapted to receive said fuel and deaerated cleansed water from said deaerator column, at least a portion of said deaerated and cleansed water comprising said heated water, and to humidify said fuel with a first portion of said deaerated cleansed water, said fuel saturator column outputting humidified fuel for use in said fuel cell anode and a second portion of said deaerated cleansed water for use as recycled water in said water heater.

21. The fuel cell system in accordance with claim 20, further comprising a water transfer assembly for transferring water from anode exhaust and outputting transferred water as a portion of said deaerated cleansed water.

22. The fuel cell system in accordance with claim 20, wherein said fuel saturator column comprises one of a packed column and a trayed column, said saturator column promoting mixing and contact between said fuel and said deaerated cleansed water.

23. The fuel cell system in accordance with claim 22, wherein said fuel saturator column is a counter-current flow packed column.

24. The fuel cell system in accordance with claim 22, wherein said fuel saturator column receives said deaerated cleansed water at a top portion of said fuel saturator column so that said deaerated cleansed water flows through said fuel saturator column in a downward direction and said fuel saturator column receives said fuel at a bottom portion of said fuel saturator column so that said fuel flows through said fuel saturator column in an upward direction toward said top portion, and wherein said humidified fuel is outputted from said top portion of said fuel saturator column and said second portion of deaerated cleansed water is outputted from said bottom portion of said fuel saturator column.

25. The fuel cell assembly in accordance with claim 20, wherein said humidifier assembly further comprises a second heater for super-heating said humidified fuel using heat from said cathode exhaust, wherein said cathode exhaust is first passed through said second heater and thereafter through said water heater.

26. The fuel cell assembly in accordance with claim 25, wherein said humidifier assembly further comprises a bypass line for bypassing a predetermined amount of said humidified fuel around said second heater, said predetermined amount being determined based on a temperature of said super-heated humidified fuel outputted by said second heater and mixed with fuel bypassed by said bypass line.

27. The fuel cell assembly in accordance with claim 20, wherein said humidifier assembly further comprises a circulation pump for recycling said second deaerated cleansed water portion from said fuel saturator column and a water blowdown assembly adapted to receive said second deaerated cleansed water portion from said circulation pump and to remove non-volatile contaminants and dissolved solids with a predetermined portion of said second deaerated cleansed water portion from said humidifier assembly using a water blowdown technique.

28. The fuel cell assembly in accordance with claim 20, wherein said humidifier assembly further comprises a controller for controlling the amount of said first deaerated water portion used to humidify said fuel by controlling a flow rate of said deaerated cleansed water provided to said fuel saturator column such that said fuel saturator column has a predetermined overhead temperature.

29. The fuel cell assembly in accordance with claim 28, wherein said controller controls the flow rate of said deaerated cleansed water provided to said fuel saturator column by controlling a flow rate of said second deaerated cleansed water portion from said fuel saturator column to said water heater.

30. The fuel cell assembly in accordance with claim 20, wherein said humidifier assembly further includes a deaerator level control member for controlling a liquid level in said deaerator column, and a controller for controlling a flow rate of said deaerated cleansed water from said deaerator column to said fuel saturator column by controlling said deaerator level control member.

31. The fuel cell assembly in accordance with claim 20, wherein said deaerator column outputs an uncondensed portion of said steam, said humidifier assembly further comprises one of a control valve member and a restriction orifice for controlling the flow of said uncondensed steam, and said humidifier assembly further comprising a controller for controlling the temperature of said deaerated cleansed water by controlling pressure within said deaerator column, wherein said controller controls the pressure within said deaerator column by controlling said one of said control valve member and said restriction orifice.

32. The fuel cell system in accordance with claim 20, wherein said deaerator column of said humidifier assembly outputs an uncondensed portion of said steam and wherein said uncondensed steam portion is mixed with said cathode exhaust upstream or downstream of said water heater.

33. The fuel cell system in accordance with claim 20, further comprising a water transfer assembly for transferring water from cathode exhaust and outputting transferred water as supply water to humidifier assembly.

34. The fuel cell system in accordance with claim 33, wherein said water transfer assembly transfers water from said cathode exhaust and outputs transferred water as supply water to said humidifier assembly, and wherein said cathode exhaust outputted by said cathode first passes through said humidifier assembly and thereafter passes through said water transfer assembly.

35. A method of humidifying fuel for use in a fuel cell system, comprising:
generating heated water by heating recycled water using heat from cathode exhaust, wherein a portion of said heated water comprises steam;
providing deaerated cleansed water, at least a portion of said deaerated cleansed water comprising said heated water, wherein said providing deaerated cleansed water comprises deaerating supply water by passing said steam from said heated water through said supply water so as to remove air and volatile contaminants from said supply water and to condense a portion of said steam into said supply water, and outputting said deaerated cleansed water; and
saturating fuel with said deaerated cleansed water to humidify said fuel with a first portion of said deaerated cleansed water, said saturating outputting humidified fuel for use in said fuel cell system and outputting a second portion of said deaerated cleansed water for use as recycled water in said generating.

36. The method in accordance with claim 35, wherein said steam is passed through said supply water by bubbling said steam through said supply water.

37. The method in accordance with claim 35, wherein said saturating is carried out with a fuel saturator column, said fuel saturator column promoting mixing and contact between said fuel and said deaerated cleansed water.

38. The method in accordance with claim 37, wherein said fuel saturator column is one of a counter-current flow packed column fuel saturator tower and a counter-current flow trayed column fuel saturator column.

39. The method in accordance with claim 37, wherein said fuel saturator column receives said deaerated cleansed water at a top portion of said fuel saturator column so that said deaerated cleansed water flows through said fuel saturator column in a downward direction and said fuel saturator column receives said fuel at a bottom portion of said fuel saturator column so that said fuel flows through said fuel saturator column in an upward direction toward said top portion, and wherein said humidified fuel is outputted from said top portion of said fuel saturator column and said second portion of deaerated cleansed water is outputted from said bottom portion of said fuel saturator column.

40. The method in accordance with claim 35, further comprising super-heating said humidified fuel using heat from cathode exhaust, wherein said cathode exhaust is first used to super-heat said humidified fuel and then used to heat the recycled water.

41. The method in accordance with claim 40, further comprising bypassing a predetermined amount of said humidified fuel from said super-heating by said cathode exhaust, wherein said predetermined amount is determined based on a temperature of said super-heated humidified fuel mixed with bypassed fuel.

42. The method in accordance with claim 35, further comprising prior to recycling said second deaerated cleansed water portion, removing non-volatile contaminants and dissolved solids from said second deaerated cleansed water portion with a predetermined portion of said second deaerated cleansed water portion using a water blowdown technique.

43. The method in accordance with claim 35, further comprising controlling the amount of said first deaerated cleansed water portion used to humidify said fuel.

44. The method in accordance with claim 43, wherein said controlling of the flow rate of said deaerated cleansed water comprises controlling a flow rate of said second deaerated cleansed water portion outputted in said saturating.

45. The method in accordance with claim 35, further comprising controlling a flow rate of said deaerated cleansed water, said controlling including controlling a deaerator level control member for controlling a liquid level during said deaerating.

46. The method in accordance with claim 35, further comprising controlling a temperature of said deaerated cleansed water by controlling pressure in said deaerating, wherein said deaerating outputs an uncondensed portion of said steam and said controlling said pressure in said deaerating includes controlling the flow of said uncondensed steam.

47. The method in accordance with claim 35, wherein said deaerating further outputs an uncondensed portion of said steam and wherein said uncondensed steam portion is mixed with said cathode exhaust upstream or downstream of said heating of said recycled water.

48. The method in accordance with claim 35, wherein a part of said heated water is exported to a customer for heat recovery from said heated water before using said heated water in one of said deaerating and generating.

49. The method in accordance with claim 35, further comprising transferring water from anode exhaust and outputting transferred water as deaerated cleansed water.

50. The method in accordance with claim 35, further comprising transferring water from cathode exhaust and outputting transferred water as supply water in said deaerating.

51. The humidifier assembly for use in a fuel cell system in accordance with claim 1, wherein said fuel saturator is further adapted to receive supply water, said supply water being mixed with said second portion of said deaerated cleansed water, and to output said supply water and said second portion of said deaerated cleansed water for use as recycled water in said water heater.

52. The humidifier assembly for use in a fuel cell system in accordance with claim 51, wherein said supply water comprises one of water transferred from anode exhaust and externally deaerated cleansed water.

53. The fuel cell system in accordance with claim 20, wherein said fuel saturator is further adapted to receive supply water, said supply water being mixed with said second portion of said deaerated cleansed water, and to output said supply water and said second portion of said deaerated cleansed water for use as recycled water in said water heater.

54. The fuel cell system in accordance with claim 53, wherein said supply water comprises one of water transferred from anode exhaust and externally deaerated cleansed water.

55. The method of humidifying fuel for use in a fuel cell system in accordance with claim 35, further comprising providing supply water for mixing with said second portion of said deaerated cleansed water, and outputting said supply water and said second portion of said deaerated cleansed water for use as recycled water in said generating.

56. The method of humidifying fuel for use in a fuel cell system in accordance with claim 55, wherein said supply water comprises one of water transferred from anode exhaust and externally deaerated cleansed water.

* * * * *